United States Patent [19]
De Jong

[11] Patent Number: 6,094,656
[45] Date of Patent: *Jul. 25, 2000

[54] DATA EXCHANGE SYSTEM COMPRISING PORTABLE DATA PROCESSING UNITS

[75] Inventor: Eduard Karel De Jong, Amsterdam, Netherlands

[73] Assignee: Belle Gate Investment B.V., The Hague, Netherlands

[ * ] Notice: This patent is subject to a terminal disclaimer.

[21] Appl. No.: 09/011,513

[22] PCT Filed: Aug. 2, 1996

[86] PCT No.: PCT/NL96/00311

§ 371 Date: Apr. 8, 1998

§ 102(e) Date: Apr. 8, 1998

[87] PCT Pub. No.: WO97/06516

PCT Pub. Date: Feb. 20, 1997

[30] Foreign Application Priority Data

Aug. 4, 1995 [EP] European Pat. Off. .............. 95202143

[51] Int. Cl.[7] ..................................................... G06F 9/00
[52] U.S. Cl. ............................. 707/100; 709/207; 705/40
[58] Field of Search ............................. 707/100; 705/40, 705/41; 340/825.34; 709/207

[56] References Cited

U.S. PATENT DOCUMENTS

| | | | |
|---|---|---|---|
| 5,204,663 | 4/1993 | Lee | 340/825.34 |
| 5,544,246 | 8/1996 | Mandelbaum et al. | 380/23 |
| 5,649,188 | 7/1997 | Carlisle et al. | 705/41 |
| 5,802,519 | 9/1998 | De Jong | 707/100 |

FOREIGN PATENT DOCUMENTS

| | | |
|---|---|---|
| 0 190 733 | 8/1986 | European Pat. Off. . |
| 0 466 969 | 1/1992 | European Pat. Off. . |
| 0 666 550 | 8/1995 | European Pat. Off. . |
| 41 26 213 | 2/1993 | Germany . |
| WO 87/07062 | 11/1987 | WIPO . |
| WO 94/10657 | 5/1994 | WIPO . |

*Primary Examiner*—Zarni Maung
*Assistant Examiner*—Khanh Dinh
*Attorney, Agent, or Firm*—Young & Thompson

[57] ABSTRACT

Data exchange system includes at least one portable data processing unit with data communication processing and memory units, the latter including an executive program and one or more application descriptors, each application description including at least one interaction context comprising commands, data elements, data references, procedures, access conditions, and external references; the structure of the data elements and the data references as well as other references is chosen in such a way that a very efficient use of the restricted memory space of e.g. smart cards is obtained.

32 Claims, 5 Drawing Sheets fig-1

DATA EXCHANGE SYSTEM COMPRISING PORTABLE DATA PROCESSING UNITS

BACKGROUND OF THE INVENTION

The invention relates to a data exchange system comprising multiple data processing units of which some, which are portable establish a temporary communication link with one or more units within the system and of which others, which are not mobile may have a permanent communication link with one or more units within the system. The processing units comprise data communication means, processing means and memory means, the latter comprising an executive program.

A similar system is known from the international patent application WO-A-87/07063 in which a system for a portable data carrier having multiple application files is described. One of the most important applications of such a portable data carrier is a smart card suitable for multiple applications. The known data carrier is described as a carrier of hierarchically structured data with security features to support multiple applications on the same data carrier. Applications are seen as sets of data. The patent application describes an implementation of an hierarchical file system on a data carrier to store alterable data in combination with an hierarchic set of access permissions. The data carrier responds to a set of common commands. File access permissions are distinct for different operations and granted in dependence on password verification. A password verification attempt counter is introduced as well as the provision of destruction of stored data as sanction against too many attempts of access. The known data carrier is presented primarily as a storage device and not as a processor. Only very simple functions may be performed by the executive program such as binary logic operation. It is not possible to allow the performance of an unspecified set of operations on request of a terminal communicating with the data carrier. The only security option is the introduction of password verification. No other access condition verifications are possible within the known system. Besides, each application of the data carrier has its own file within the memory means of the data carrier. No special measures are taken to enhance the efficiency of the available memory space which, especially on smart cards, is very restrictive and therefore sets limits to the number of possible applications.

EP-A-0,479,655 relates to the implementation of access condition checks in smart cards. One specification technique for that is disclosed, however, it is desirable to provide for measures to include the possibility of other access condition verifications.

EP-A-0,361,491 relates to a chip card programming system to allow protected (re)programming of cards. It describes the use of write-once-access conditions to control access of parts of the programmable memory to be programmed. In this way the number of applications on a single card can be extended. Verification of the access conditions with a variety of techniques including cryptographic protocols is described.

EP-A-0,292,248 relates to loading of applications on a smart card using an unalterable operating system program. It includes the implementation of a data access condition enforcement method using memory zones with assigned access attributes. Specific access conditions are "write-once" (which is only described implicitly) and "execute-only".

US-A-4,874,935 relates to card programming using a data dictionary where the data dictionary describes the layout of data elements stored in the card's memory. Data dictionaries are commonly understood to differ from directories in that they not only describe data actually stored, but also data which will be stored later. In addition, data dictionaries usually include a description of the data format. In compiled format data dictionaries are used in database management systems where they are stored on the hard disc as part of the database. They are also found in the object load files resulting from program compilation in software development environments. However, the patent does not claim a representation of data dictionaries particularly suited for smart cards.

EP 0 466 969 A1 relates to providing functions in the smart card executive program to support the correct conduction of a sequence of messages between smart card and terminal by reserving part of the memory of the card as storage of state information and providing specific means to implement a state engine controlling state transitions. Such state information being crucial in determining actions to perform on reception of messages. State engines accepting a variable sequence of messages are well known from computer language compiler design and computational complexity theory. The patent does not address the possibility to implement varied sets of possible actions specific to a number of possible applications which may reside simultaneously in the smart card.

SUMMARY OF THE INVENTION

The main objective of the present invention is to present means to formally, precisely and uniquely describe a system consisting of trusted processing units in the way these processing units will behave when engaged in communication amongst themselves where such communication is intended to transfer value or other trusted information. Such comprehensive descriptions of the possible modes of communication between the data processing units being applicable both to the system as a whole and the detailed operations of the individual processing devices. Such formal description providing the basis for formal reasoning in the verification of correctness of implementations, which will be required for acceptance of systems intended for world wide deployment.

A further object of the present invention is to present means to cope optimally with the restrictions imposed by limited physical dimensions of available memory space on portable data processing units, especially smart cards.

A further object of the present invention is to offer a more general mechanism of protected loading of program codes and to allow such a loading for multiple programs each for one application of each portable data processing unit.

Moreover, the present invention is directed to the provision of the use of access condition verifications not prescribed by the manufacturer of the portable processing unit but chosen by the application designer to suit his particular needs.

Further more the present invention is directed to provide a mechanism to protect the Communication between processing units such that the content and orderly sequence can not be disrupted by any intervening or mediating devices.

Therefore the system according to the invention is characterized in that the memory means of the totality of the processing units further comprises descriptions of the possible modes of communication between the data processing units as "interaction contexts" which contain descriptive data structured in accordance with the following data structure:

a. a set of basic distinct communication primitives which are accepted whenever one of the data processing unit communicates with one or more of the other units;

b. a set of procedural descriptions defining the actions to be performed in response to the accepted communication primitives;

c. a set of data elements either permanently stored or computed, which are available for use when the procedures as defined in the procedural descriptions are performed;

d. a set of references to data elements which references are associated to the procedural descriptions, said data elements are accessible to possibly further interaction contexts and are available for use when procedures as defined the procedural descriptions are performed;

e. a, possibly empty, data list comprising a possibly ordered set of references to data elements which are available for explicit reference as part of a communication primitive to be used by the procedural descriptions associated with the communication primitives;

f. a set of access conditions associated to the data elements which are consulted in association to the data elements which are referenced in association to the procedural descriptions;

g. a set of access conditions associated to the list of data references in the data list.

By organizing the description of the system of communicating trusted processing units in this strict framework its operations as far the conditions and effects of possible communications between the devices is completely and exhaustively described. Augmented with formally precise semantic definitions of the structure elements the data becomes amenable for formal reasoning and therefore the implementation of the system becomes better amenable for formal review of correctness. For this purpose it is not necessary that all data resides in all memory means of the individual processing units. It is sufficient that such data is loaded into a processing unit prior to it being used. The secured loading of such data is included in the current invention.

In a first preferred embodiment the individual processing units in the data exchange system described as above are characterised in that the memory means of the processing unit further comprises at least one interaction context containing the following coherent data structure:

a. a set of basic distinct communication primitives which are accepted whenever one of the data processing unit communicates with one or more of the other units;

b. a set of procedural descriptions defining the actions to be performed in response to the accepted communication primitives;

c. a, possibly empty, set of data elements either permanently stored or computed, which are available for use when the procedures as defined in the procedural descriptions are performed;

d. a, possibly empty, set of references to data elements which references are associated to the procedural descriptions, said data elements are accessible to possibly further interaction contexts and are available for use when procedures as defined the procedural descriptions are performed;

e. a, possibly empty, data list comprising a possibly ordered set of references to data elements which are available for explicit reference as part of a communication primitive to be used by the procedural descriptions associated with the communication primitives;

f. a set of access conditions associated to the data elements which are consulted in association to the data elements which are referenced in association to the procedural descriptions;

g. a set of access conditions associated to the list of data references in the data list;

h. wherein a data unit contains more than one interaction context at least one of the communication primitives it accepts will be to selectively indicate one of the said interaction contexts for further referral in the processing unit accepting the communication primitive.

By defining data within the memory means of the portable processing unit in such a way the processing unit is really organised as a processor, i.e. it not only allows adding and subtracting but it performs processes which may be loaded in the processing unit by persons authorized to do so, e.g. a staff member of a bank. By providing procedures which may provide arbitrary complex operations in response to received commands and providing an explicit list of stored data elements which are addressable as part of such commands the communication bandwith can be optimally used; resulting in a reduced number of commands exchanged. With a system according to the invention many actual uses of the system will but require the exchange of two commands. The only thing that is fixed is the structure within the memory means which is defined in such a way that several applications of the unit may be added in a very efficient way, i.e. by using as little additional memory space as possible. This is especially of prime importance if the unit is a smart card which is severely limited as regards available memory space. Besides, the structure according to the invention offers all possibilities to include security measures in order to inhibit unauthorized people from access to processes or data that they are not entitled to use.

An advantageous embodiment of the invention can be realised if the processing unit which contains multiple interaction contexts is further characterized in that the set of the procedural descriptions at least comprises a first procedural description to be performed in response to the communication primitive, or primitives, which indicate one of the said interaction contexts for further referral in the processing unit accepting the communication primitive, such performance resulting in a proper activation of the indicated interaction context. The description of this context activating procedure can with benefit be used to define the security requirements associated with selecting the context and to perform initialisation of any security and operational data in the volatile part of the memory means. Further advantage can be obtained with processing units which contain multiple interaction contexts as characterized in that the set of the procedural descriptions at least comprises a last procedural description to be performed in response to the communication primitive, or primitives, which indicate one of the said interaction contexts for further referral in the processing unit accepting the communication primitive, such performance resulting in a proper deactivation of the interaction context which was indicated while the communication primitive was received. This deactivation procedure gives control to the application which is about to be superseded by reception of the communication primitive. This gives the designer of applications an opportunity to perform clean up the memory content and round off operations when the application is aborted which may be unexpected.

In a further preferred embodiment the data exchange system defined above is characterized in that the memory means further comprises at least two interaction contexts, at least one application description and a memory element storing a reference to the interaction context currently being in force, each application description comprising:

a. a data list comprising references to data elements, which references may be accessible to two or more interaction contexts and may be extended by additional data elements;

b. a further set of access conditions associated to said references or to said additional data elements and defining restrictions of use.

By these measures all references to data elements which are common to different interaction contexts are accessible for all those interaction contexts, so they only need be stored once saving memory space. Also common access conditions to said data references are accessible to predetermined interaction contexts. Therefore, also these common access conditions need only be stored once thereby saving memory space and enhancing efficiency.

Each application description may also comprise a procedure library comprising codes which can be used by procedural descriptions of each interaction context associated to each of said application descriptions.

Preferably, the processing unit is suitable for at least two applications with use of little additional memory space. To obtain this object the data exchange system according to the invention is characterized in that the memory means comprises at least two application descriptions and units of executable code which can be used by procedural descriptions of each interaction context within each application description or by each unit of executable code of each procedure library within each application description.

Preferably, the units of executable code in the procedure library are enhanced by including a specification of the use of their operational parameters into classes relating to attributes pertaining to data elements which can be passed as actual value in a computation, which computation only proceeds if the data attributes and parameter classes match. This is an efficient way of verification of access conditions both on data level and on function level for which a very efficient implementation exists.

More reliability of the system is offered if the data exchange system according to the invention is characterized in that the executive program comprises a reference to a default interaction context which is used to initialise the memory element storing a reference to the interaction context currently being in force, in order to carry out a final action after a detection of an internal inconsistency in a recovery to a normal state of operation or whenever the executive program is active and no explicit interaction context has been specified by a communication primitive received from a similar data processing unit.

In order to further improve the compactness of implementation of procedural descriptions, procedure libraries, code fragments and the executive program, the data exchange system according to the invention may be characterized in that the executive program comprises routines constituting an interpreter for coded instructions for an abstract processor, such that the majority of procedural descriptions and some of the units of executable code are coded in numeric values for interpretation by said interpreter routines. In addition the abstract code interpreter provided by the executive program aids in formally verifying correctness of the implemented functions as the use of an abstractly designed instruction set and a small number of small implementing routines may make such verification better amenable to formal methods of reasoning and proof generating.

With further advantage with respect to compactness of storage of the interaction context descriptions and application descriptors the data exchange system according to the invention may be characterized in that the procedural descriptions are encoded as indexes in a list over a sub set of procedures contained in the library of procedures comprising units of executable code. Specifically in the context of the current invention these dispatch tables can be deploy with advantage as the number of distinct procedural descriptions by nature of the data structure will in general be very small, e.g. less than 16 such that the system may further be characterised in that the encoding of the procedural descriptions is in such small values that more than one description can be held in a basic unit of access for the memory means or that the description can be combined with other relevant information in the same basis unit of memory access. To address the rarely expected case where the number of procedural descriptions within a single interaction context is more than the encoding space directly allows for, a system implemented according to the current invention can with benefit use an additional level of indirect reference such that it can be characterized in that at least one of the encoding values of the procedural descriptions refers to a special function of the executive program that is designed to select by indirection the actual function to perform for the encoded procedural description possibly by incorporating additional coding information stored in association with the procedural description encoded with said special values. Such additional compactness of storage of the data in the execution context data structure will be beneficial specially when considering that the memory means will in general be required to hold a considerable number of different application and context descriptions.

In order to enhance the security of data and functions within the processing unit the data exchange system according to the invention may be characterized in that the memory means comprises an interaction context dedicated to comprise Personal Identification Numbers and that the executive program is arranged to verify Personal Identification Numbers supplied by a user of the data exchange system.

Advantageously the Personal Identification Number management interaction context and the default context can be implemented as part of the same device holder application. Support of this application by most devices with which a device according to the invention communicates would give the device owner the opportunity to review his personal data as stored in the device memory, for instance a smart card holder could be allowed to modify his PIN at any smart card terminal which provides an appropriate user interface.

Advantageous versatility in choice of the cryptographic protection methods to be used for loading the memory means with data describing the interaction contexts and the applications can be offered in a data exchange system according to the invention characterized in that the memory means comprises at least one interaction context dedicated to manage the number and content of other interaction contexts also contained in said memory means. Offering such versatility with different levels of security and operational complexity may be required by the market in portable processing unit for loading different applications on the same card as well as to establish a choice of distinct product for issuing organisations which are all built according to the same basic application infra structure, such as provided by the invention. Currently, solutions to this problem rarely exist and are commonly based on proprietary special functions implemented as integral part of the executive program, offering neither a uniform method nor a range of options.

Each application description may comprise a list of numeric values which is constructed to provide identifiers for all interaction contexts and comprises at least one of the following numeric values, a first indicating an application type, a second numeric value indicating a unique identification of the entity providing the application, a third numeric value indicating the nature of the application description and further numbers each uniquely referring to one interaction context associated with the application description.

The string of numeric values uniquely referring to an interaction context provides a means of establishing interoperability between two communicating devices which is more efficient than is currently envisaged for e.g. smart cards in relegating to the application providing entity the responsibility to assign unique values to each interaction context while leaving assignment of unique numbers to entities and application to relevant bodies of sectoral and international co-operation respectively. With benefit the application providing entity can assign the unique context numbers to incorporate implementation version and secret key generation information.

A data system in accordance with the current invention can be implemented such that it is characterised in that data communication means may be arranged to structure data exchange in blocks of data comprising at least two parts, a first part being data qualified as operational in that it is used to influence the nature of the operations performed by a command as indicated by a communication primitive or data resulting from operations carried out, a second part being qualified as security in that it is used to determine the appropriateness of performing an operation or of the acceptability of data within the operational part, to be used in the operation or to proof completion of the operation or correctness of the resulting data. Such appropriateness, acceptability, proof and correctness being obtained by performing relevant cryptographic operations on the data.

Such structure of messages in the data exchange and the order of cryptographic computations before and after the performing the operational definition proper this entails provides a mechanism for protection against in-the-middle attacks on protocols of data exchange. In particular it can be used to obviate the need for explicitly maintained security state in the memory means of each of the processing units as it allows as cryptographically encoded state information be exchanged in each message being contained in the part designated for security: verifying the cryptographic condition securely initializes the state variable which will need to be stored in the memory means only till the response message is sent and no longer, reducing the time such state information is exposed to attempts at tampering. Finally, this structure of messages allows a more liberal use of end-to-end security in which security in the communication does nor depend on any intervening or mediating devices.

Authentication and data protection are thus made an integral part of the command execution providing better security than obtainable in current systems e.g. smart cards.

The executive program may be arranged to perform, upon accepting a communication primitive to perform operations specified in the current interaction context, each operation as part of a predetermined and fixed sequence of actions each of which is specified separately as part of a procedural description associated to the accepted communication primitive, which procedural description at least comprises distinct descriptions, any of which may be void, for the following actions:

a. authorization of the use of the communication primitive;
b. decryption of operational data or any part of it;
c. performing a command with input data;
d. encryption of any operational data resulting from any operation performed;
e. computation of a proof of completion of any performed action or of correctness of the resulting data to be used in security computations.

Security is further enhanced if the data processing unit generates a random transaction number upon initializing data transfer, which serves as basis for cryptographic computations.

To provide for a possibility to enter a new interaction context if required one communication primitive may be assigned a specified value which will always be interpreted as a request to enter a new interaction context.

In a further preferred embodiment the data exchange system according to the invention is characterized in that it comprises a further data processing unit comprising the same elements as the data processing unit which might optionally contain in its memory an application programmers interface which consists of program code designed to allow additional computer programs to be implemented to give users control over the sequence of exchanged communication primitives or to influence the data transferred in them or to learn or further process the data received in the exchange.

In such a preferred embodiment of the invention the communication primitive used to enter a specified interaction context may comprise numeric values to be used in security calculations in subsequent communications, a first value generated randomly or of similarly unique nature by one of the processing units and possibly a second value serving to proof the authenticity of said one processing unit or to otherwise identify said one processing unit.

To further benefit from the current invention, each communication primitive may further be structured to consist of two or more numeric values which enhance the expressive power of the communication primitive for interpretation by the executive program.

As a first alternative, each communication primitive except a first one signalling a reset may be composed of two or more numeric values, a first value being used to refer to a procedural description of an action associated to the communication primitive, a second value being composed of a fixed number of binary values each of which is interpreted by the executive program as a reference to a single data element.

As a second alternative, each communication primitive except a first one signalling a reset may be composed of two or more numeric values, a first value being used to refer to a procedural description of an action associated to the communication primitive, a second value being used to determine which of the data elements available for external reference in an active interaction context will be used while performing responding actions in such a way that any data element is selected if it contains a value that matches said second value or if it contains a value that is otherwise sufficient to indicate it.

As a third alternative, each communication primitive except a first one signalling a reset is composed of two or more numeric values, a first value being used to refer to a procedural description of an action associated to the communication primitive, a second value being composed of a number of binary values which are assigned specific meanings by the executive program to be used in interpreting data formats in the communication primitive and in performing responding actions.

The abovementioned portable processing units may be implemented in smart cards or in PCMCIA cards.

In a further elaboration of the invention the communication means utilizes external communication means to establish a data link such external communication means as are made available to the data processing unit by the data processing unit, or similar such electronic device hosting the PCMCIA or smart card which implements the data processing unit.

In an alternative of the invention the data processing unit is implemented as portable personal computer.

The communication means may utilize a smart card reader or a PCMCIA card slot.

Furthermore, the communication means may primarily or additionally utilize non contact data transfer with electromagnetic fields c.q. particles.

The context mechanism defined above and the techniques it makes available leads to a wider range of smart card use and an approach of smart card application development which have a number of advantages over the traditional ways.

First of all, it allows the execution of application specific program code in a smart card without the need to thoroughly examine the code for potential threats to the security of data stored for other applications. As the access conditions which are stored with the data on the card are enforced by the card operating system without possibility of outside interference during execution of application code, a multi application card scheme does not need a program code vetting authority. Such authority is the only way to allow a private code execution facility in traditional smart cards. By approving code for execution on a card a vetting authority incurs liabilities with respect to the overall system security; it makes the management of multi application smart card schemes much more complex. The associated complexity and costs make application specific code in traditional card schemes almost infeasible. With the new technique the demand for this facility from smart card application providers which has been there for some time can be met.

Secondly, as direct consequence of protected application specific programs in cards a specific application can be implemented that is dedicated to load other applications in the card. In this way, the applications once loaded in a card can be protected from the very application that loaded them. This protection gives parties involved in a multi application card scheme especially the card issuing entity and the application providing entities a basis for their business agreement. Being based on tangible thins as the amount of storage needed on each card, the number of cards to be equipped and the duration of the application on the card instead of an abstract notion of "trust" and "good care" the application providers contract is easier to formulate than in traditionally implemented smart cards. Moreover, the card issuer and application provider do not need to share secret keys and protect this sharing with contractual obligations and mutually agreed key transportation facilities.

Thirdly, the application software if implemented based on the new technique has several benefits compared with prior art smart card operating systems:

A minimal exchange of date between a terminal and a card is needed to establish interoperability between card and terminal, e.g. they support the same application(s). Values of data to be exchanged can be structured as proposed in the draft international standard ISO 7816-5;

To complete a transaction between card and terminal the minimal number of data exchanges as theoretically inferred can actually be used, because the transaction is completed as a private computation, instead of the necessity to use a lengthy sequence of standard commands;

It allows controlled access to data without requiring an involved access path dictated by a directory and file hierarchy shared by all applications as currently in use and proposed for standardisation;

It allows the development if the terminal and smart card application in tandem, which development process can be supported with computer software tools such as compilers and emulators. Design and implementation of card and terminal software can thus be lifted above the tedious and error prone assembly language coding currently required;

It allows standardization of equipment, both cards and terminals, using an abstract formalism to describe the device capabilities which gives flexibility towards future developments, such as new features offered by card or terminal manufacturers. The standardized terminal capability could include an API. In contrast current standardization efforts in smart cards concentrates on prescribing fixed data contents of messages to provide identification values to be interpreted in a way as determined by the standard, which leaves little room for new developments.

Finally, with the new technique implementors of smart card operating systems are given great freedom of designing optimal implementations of the card's operating system kernel and terminal operating system. Smart card hardware designers are given several options to optimize chip silicon use with hardware support for basic operation included in the system kernel. Hardware cost reduction obtained starting with the specialized design defined above can be greater than when based in improvements on general purpose single chip computers.

BRIEF DESCRIPTION OF THE DRAWINGS

The invention will now be described in detail with reference to some drawings which show an example of the implementation of the general principles of the present invention.

DESCRIPTION OF THE PREFERRED EMBODIMENT

Figure 1:
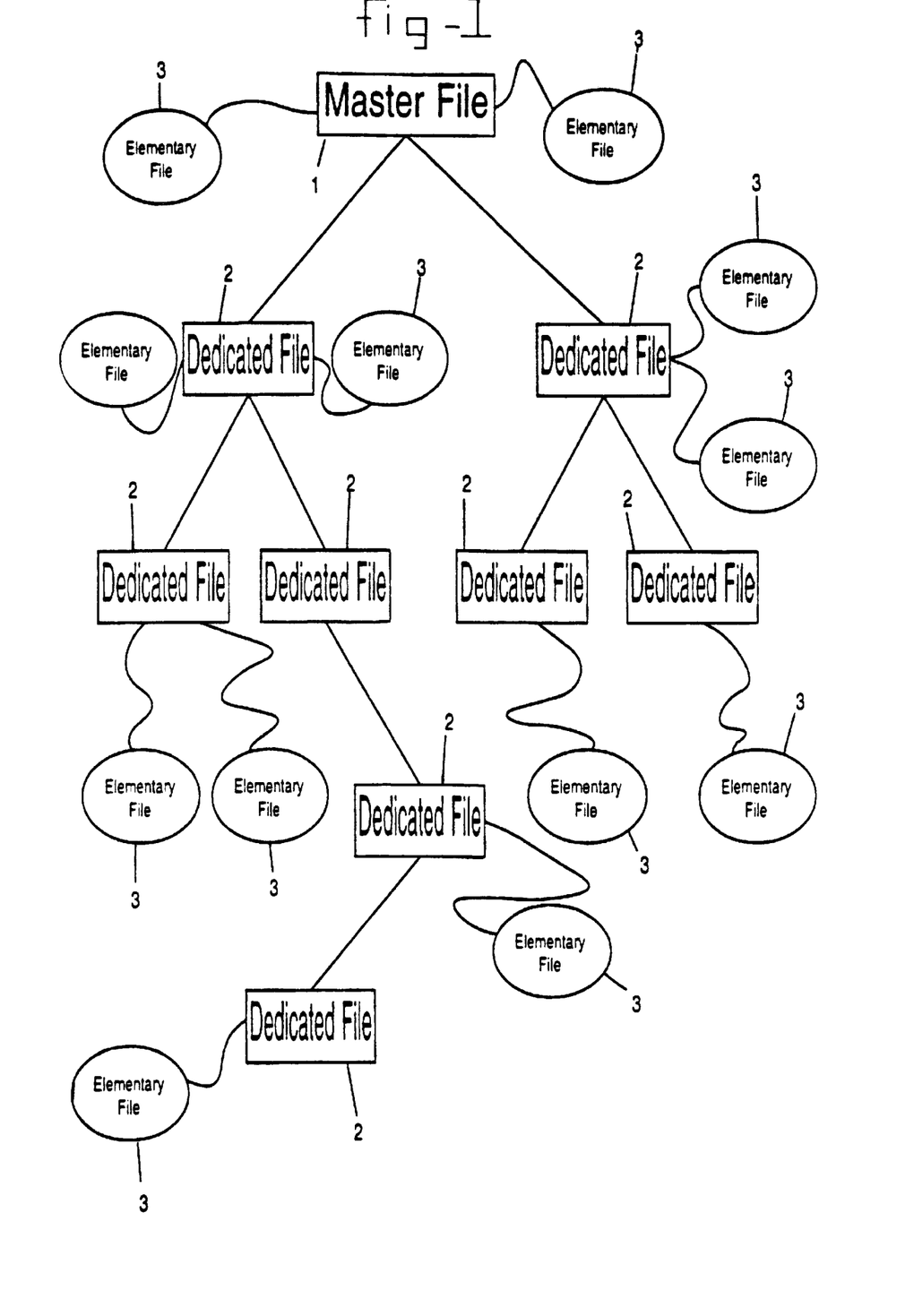
FIG. 1 shows a prior art application design on smart cards based on an hierarchically organized collection of data elements.
Figure 2:
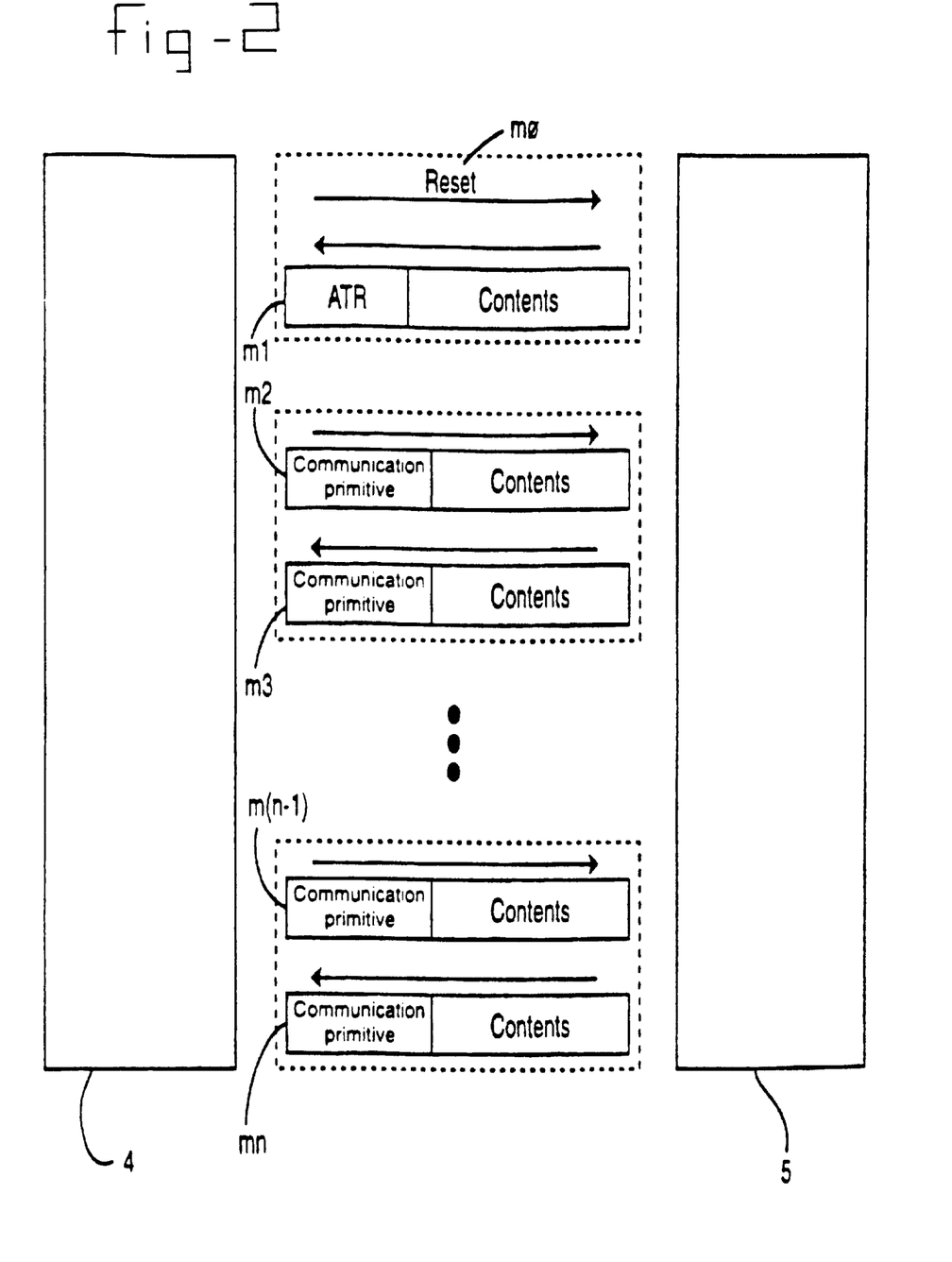
FIG. 2 presents a diagram of the communication flow between a portable processing unit and a similar processing unit in a format currently accepted as standard.

The structure of data and files in prior art systems is depicted in FIG. 1. Basically there is a master file 1 which is connected to several elementary files 3 and one or more dedicated files 2. Each dedicated file may be connected to one or more further dedicated files 2 and to one or more elementary files 3. The prior art used tree-like hierarchy of directories and files. The number of subordinate levels in the prior art structure is in principle unlimited. The terminology used in FIG. 1 is taken from the international ISO standard 7816-4. According to the standard format for communication flow between a portable data processing unit 5 and a similar data processing unit 4, as shown in FIG. 2, the communication comprises a set of pairs of blocks. The communication starts by a reset signal mø from the data processing unit 4. Such a reset signal may be outside the communication bandwidth such as generated by power-on-logic in data processing unit 5 but conceptually is part of the orderly exchange of messages. The portable data processing unit 5 responds with an answer to reset (ATR) ml possibly followed by contents. All subsequent pairs of blocks m2, m3, . . . , m(n–1), mn consist of blocks headed by distinguishing values followed by contents and constitute distinct communication primitives.

Figure 3:
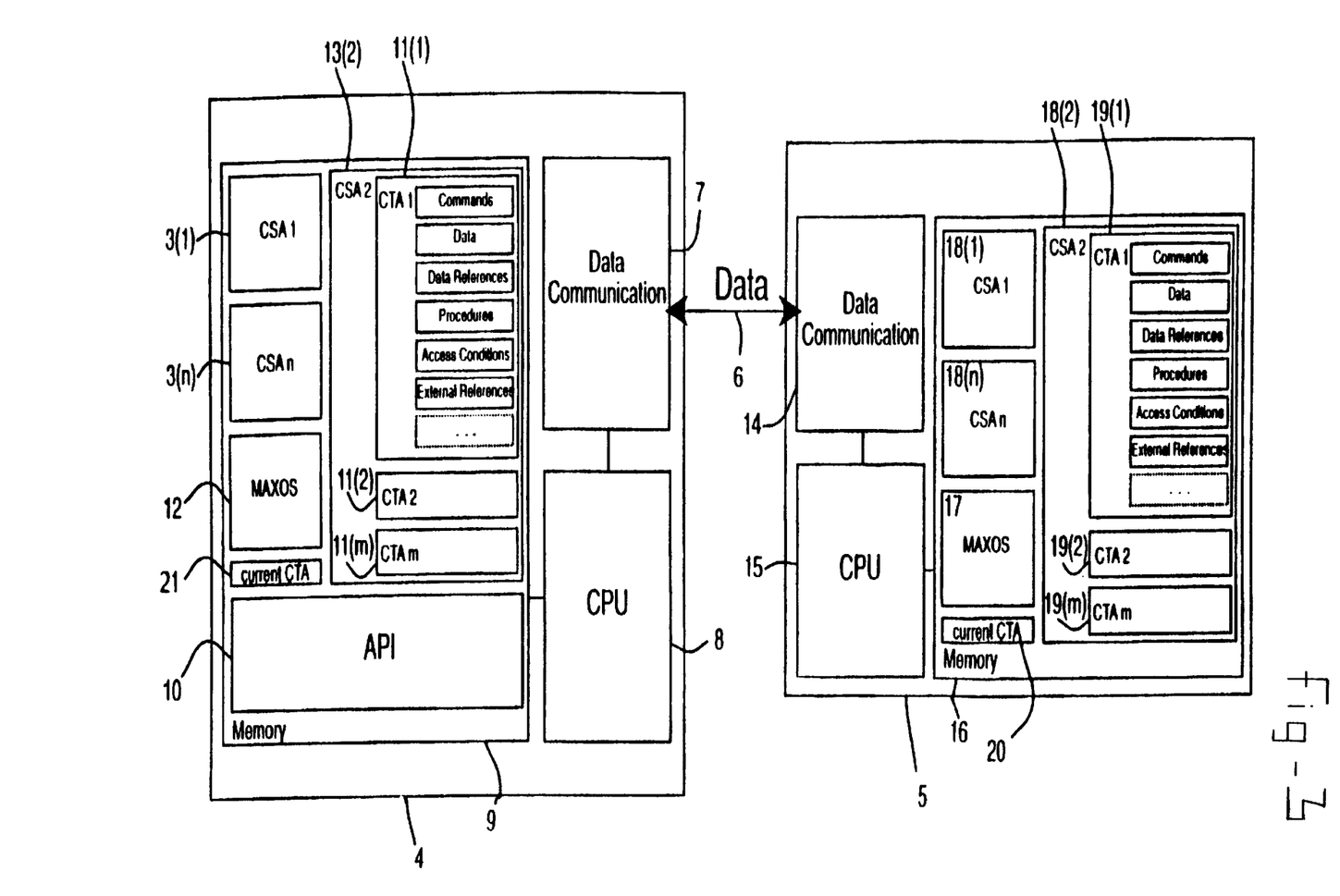
FIG. 3 presents a basic implementation of the present invention using interaction context in portable processing units, such as smart cards, or PCMCIA cards, and more stationary processing units such as card terminals or portable personal computers.

FIG. 3 shows the internal structure of two data processing units according to the invention which are communicating with each other by transmitting and receiving data. The left data processing unit 4 may be, among others, a terminal and the right data processing unit may be, among others, a portable data processing unit, e.g. a smart card. However, the invention is also applicable to two or more portable data processing units able to communicate with each other by appropriate communication means or approprate connection topology.

Each of the data processing units 4, 5 comprising data communication means 7, 14 through which structured blocks of data can be exchanged. Each of the data processing units comprises processing means 8, 15, and memory means 9, 16. The memory means 9, 16 could be any configuration of read-only memory (ROM), random access memory (RAM) and programmable read-only memory such as electrically erasable programmable read-only memory (EEPROM).

The memory means 9, 16 comprises an executive program 12, 17, here indicated by "MAXOS". If the portable data processing unit 5 is suitable for two or more applications the memory means 9, 16 comprises application descriptions 13(1) . . . 13(n), 18(1) . . . 18(n). There are as many application descriptions as there are applications of the data processing unit concerned. Each application description is indicated by "CSA". The second application description 13(2), 18(2) has been shown on an enlarged scale in FIG. 3 to allow display of the contents of each application description. Each application description 13(i), 18(i) comprises at least one "interaction context" 11(1) . . . 11(m), 19(1) . . . 19(m). Each interaction context is indicated by "CTA". The first of these interaction contexts 11(1), 19(1) has been shown in an enlarged scale to allow display of their contents. Each interaction context contains:

- a set of commands specifying the communication primitives recognized by the interaction context and referencing appropriate procedures specified in a set of procedures;
- a set of data;
- a set of data references to date residing in other interaction contexts if any;
- a set of procedures that may be performed by the executive program 12, 17;
- a set of access conditions to the data elements;
- a set of external references referring to data elements to be used by commands issued by the other data processing unit;
- optionally, developer specified other lists.

Finally, the memory means 9, 16 comprises a memory element 21, 20 that contains a reference to the "current CTA", i.e. the interaction context currently in force.

The intention of several interaction contexts within one application description is to provide a functional separation in possible interactions between the data processing units 4, 5. This is especially relevant when the functional separation is also a separation in security conditions. An example may be a first interaction between a smart card and a terminal to open, for instance, a door and a second interaction when programming doors that are allowed to be opened. The second interaction needs a better security than the first interaction and is assigned its own interaction context. To obtain access to the interaction context is the first step in assuring the security of the operations that may be executed within the interaction context.

Figure 4:
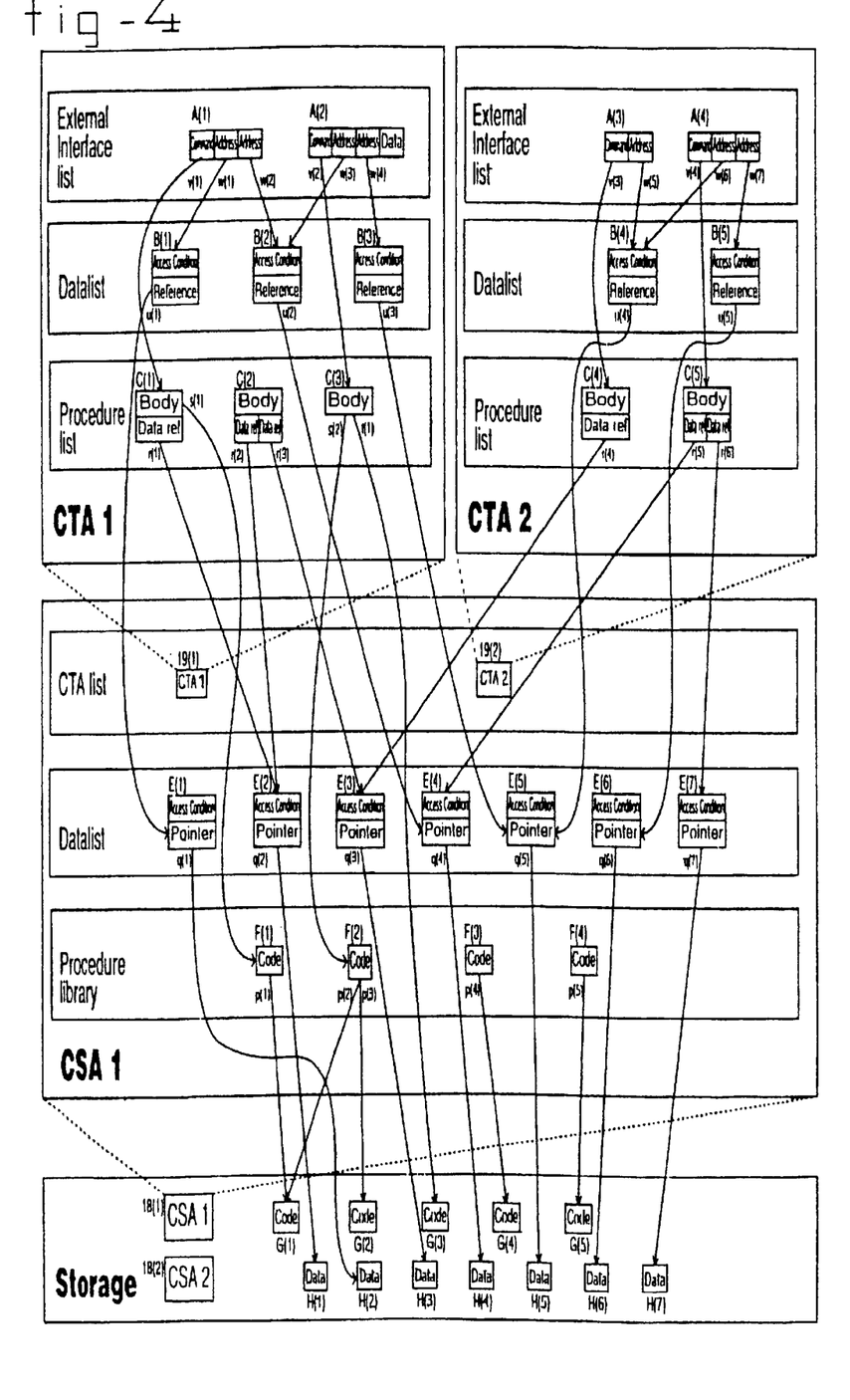
FIG. 4 presents an example of a practical organization of an execution context, highlighting different relationships between procedural descriptions contained in the interaction context and data elements and library functions used while performing the procedures.

FIG. 4 shows a practical approach to implementation of the context mechanism displayed as a memory organization model which shows the relations between data elements, access conditions and procedures. The structure of FIG. 4 applies whenever there are two or more applications of the portable data processor unit 5. If there is only one application the structure is strongly simplified, as will be explained later. In FIG. 4 the reference numbers of the data processing unit 5 are depicted. However, the structure of FIG. 4 is likewise applicable to the memory means 9 of the data processing unit 4. In FIG. 4 data element descriptions and procedure descriptions are optimally organized to reflect sharing of program code and sharing of data between different interaction contexts (CTA's) which make up one application (CSA).

The memory means 16 comprise data elements H(1) . . . H(7), executable code elements G(1) . . . G(5) which are part of the operating system, and application descriptions 18(1), 18(2) (CSA1, CSA2). In FIG. 4, data and code which are internal to the operating system are left out. The number of data elements, executable code elements and application descriptions as presented in FIG. 4 is only given by way of example: the numbers may vary as required in reality.

Each application description 18(1), 18(2) is physically present in the memory means. They provide a first bottom layer of abstraction to reflect memory use. Each application description 18(1), 18(2) consists of:

- a procedure library consisting of units of executable code F(1) . . . F(4) that may refer to code elements of the operating system made available for this purpose, as indicated by arrows P(1) . . . P(5);
- a list of data elements E(1) . . . E(7) to be used by procedures within the interaction contexts 19(1) . . . 19(2) within the present application description 18. This data list comprises data access conditions and pointers q(1) . . . q(7) tD storage areas holding data elements;
- an interaction context list comprising a number of interaction context descriptions 19(1), 19(2).

The number of elements within the procedure library, the list of data elements and the interaction context list within the application description 18(1) as shown in FIG. 4 is for presentation purposes only. Of course, the number of elements may vary depending on the desired application.

The content of the interaction contexts 19(1), 19(2) and application description 18(1) data structures in processing units 4, 5 which take part in the exchange of data is complementary in that the response from one unit is interpreted as a command by the other unit. Through this complementary nature the possibly compactly encoded content of the data structures can be generated from a single textual description. A data exchange system in general consists of many implementations of the processing units with different purpose, which during the course of operation of the system may enter into communication for an exchange of data to fulfil this purpose. Each processing unit may only contain in its memory means only such part of the data structure as is relevant to its intended purpose in the system. The system as a whole is described by the collection of all the different contents of interaction contexts. Also some of the interaction contexts or part of their content may be loaded at any time as required. Such loading can be done safely for instance as protected by the management application alluded to above.

Interaction contexts 19(1), 19(2) are physically present in the memory means storing the application description 18(1). Logically, the interaction contexts provide a second layer of memory use control. The combined control provided by this second layer and the application description layer gives an effective implementation of an execution context mechanism for portable data processing units, such as smart cards. Each interaction context 19(1), 19(2) comprises:

- a list of procedural descriptions C(1) . . . C(5). These procedure descriptions may refer to procedural descriptions in the procedure library within the application description 18 as indicated by example arrow s(1). Alternatively these procedural descriptions may refer to executable code elements G(1) . . . G(5) provided by the operating system, as indicated by example arrow t(1). As a further alternative these procedural descriptions may contain explicit references to any data elements which are used by the procedure during execution and which are present in the data list of the application description 18 concerned, as indicated by arrows r(1) . . . r(6);
- a data list containing data elements B(1) . . . B(5) exclusively available for use by the procedures in the interaction context concerned. Data elements are represented as references to the data list of the application description 18 concerned with associated access conditions to adhere to when accessing the actual data, as indicated by arrows u(1) . . . u(5);
- an external interface list comprising communication primitives A(1) . . . A(4) which are accepted as commands by the interaction contexts 19(1), 19(2) concerned. Each command within a communication primitive refers to a member of the procedural descriptions C(1) . . . C(5) of the procedure list within the interaction context concerned, as indicated by arrows v(1) . . . v(4). The commands when issued by the communicating device 4, may refer to elements in the data list of the application description by one or more addresses following the command. Each command may be accompanied by data elements as input to the command processing. The number of addresses as given here is by example only and is determined for each command as required in reality.

Protection of data elements is provided for by the provision of access conditions. Any external command within a communication primitive A(1) . . . A(4) can only address data elements referenced in the data list of the interaction context 19 concerned. Access is only allowed if the access conditions are met. These access conditions specify the type of access that is allowed for the command; such an access condition may be no access, read-only access, read-and-write access, and secret key use. Other access conditions may be applied too. For example, the command of communication primitive A(1) may have read-only access to data element B(2) through reference arrow w(2), while the command of communication primitive A(2) has read-and-write access to the same data element B(2) through reference arrow w(3).

Procedural descriptions C(1) . . . C(5) can refer to data elements in the data list of the application description 18 concerned and no others. Again, access is only provided if the access condition is met. These access conditions also specify the type of access that is allowed: for instance, no access, read-only access, read-and-write access, and secret key use. Access conditions for different procedural descriptions within the same interaction context 19 may differ for the same application description data list element E(1) . . . E(7), e.g. reference arrow r(1) may represent a read-only access condition, whereas reference arrow r(2) may represent a read-and-write access condition.

Access conditions are checked on the relevant level, i.e. application description level or interaction context level and only once. An element B(1) . . . B(5) of the data list within an interaction context 19(1), 19(2) refers directly by arrow u(1) . . . u(5) to the pointer of a data element in the data list of the application description 18(1) because the access conditions are already met in the data list element E(1) . . . E(7) of the application description 18(1). Procedural descriptions C(1) . . . C(5) within an interaction context 19(1), 19(2) which refer to data list elements within application description 18(1), however, have to first meet the access condition associated with the data list elements E(1) . . . E(7) within the application description 18(1). Any data elements or procedural description elements within the data lists of the application description 18(1) and its associated interaction contexts 19(1), 19(2) cannot be referred to by any other application description within the memory means 16. The executable code which constitutes the procedural description can only address data by indirection via the restricted set of data references associated with each of the procedural descriptions C(1) . . . C(5). Using data elements described by B(1) . . . B(5) the list of reference is temporarily extended by the executive program with references to data element as obtained by evaluating addresses which are actually specified in the communication message accepted as the command associated with the procedural description. Thus no other data can be accessed than explicitly specified, and only observing specified conditions of use. In other words, the preferred memory reference model of FIG. 4 as regards the application description with its associated interaction contexts provides an exclusive context for operations within one single application of the data processing unit 5. Data elements H(1) . . . H(7) are stored in the memory means 16 common to all applications but contain data for exclusive use within the context of application description 18(1), such exclusivity is guaranteed by the executive program in allowing existence of a single pointer to each storage location such as q(1) from E(1) to H(2). Only the code elements G(1) . . . G(5) may be referred to by any of the application descriptions 18(1) . . . stored within the memory means 16. These last references of other application description than application description 18(1) to the common codes G(1) . . . G(5) are not explicitly indicated in FIG. 4. However, any person skilled in the art can easily extend the structure of FIG. 4 to two or more application descriptions 18(1), 18(2), . . . .

After having explained how data elements may be protected by the use of access conditions of different kinds, now, memory management provisions will be explained. For memory management, it is desirable that alterable data (data elements) and not alterable data (operating system code) can be managed by the operating system separately. The memory reference model as shown in FIG. 4 provides a separation of code and data elements within the memory means 16 which are referred to by pointers q(1) . . . q(7), p(1) ... p(5) from the data list and the procedure library, respectively, within the application description 18 concerned. Data list elements within each interaction context 19(1), 19(2) only contain references to these pointers and no direct references to the codes G(1) ... G(5), and the data elements H(1) ... H(7) within the memory means 16. The data list of the application description 18 concerned provides the level of indirection required by the operating system to perform memory management.

Code duplication is avoided by providing common code libraries on two levels: "command bodies" like procedural description C(3) which refer to code element F(2) in the procedure library in application description 18(1) in order to share common codes among different interaction contexts. However, the body of procedural description C(3) also refers directly to a code G(3) stored in the memory means 16 and provided by the operating system. All code elements G(1) ... G(5) provided by the operating system are implemented for efficient execution.

Reference to code elements F(1) F(2) may be with a memory address or with additional levels of indirection with indexes in appropriately constructed tables. The hierarchical structuring of references provided here is very suitable for such an implementation with indexes.

Fundamentally, the memory structure according to FIG. 4 is also applicable in situations where only one application of the data processing unit 5 is provided for. In that case the only application description 18(1) may even coincide with one interaction context 19(1), which interaction context then contains the following coherent set of definitions:

- a. a set of basic communication primitives A(1) ... which are accepted whenever the data processing unit 5 communicates with a similar unit 4, said primitives at least including a primitive used to enter said at least one interaction contexts;
- b. a set of procedural descriptions C(1) ... defining the actions to be performed in response to each of the accepted communication primitives A(1) ..., at least comprising a first procedural description to be performed upon activating the interaction context, and a last procedural description to be performed immediately before deactivating the context;
- c. a, possibly empty, set of data elements H(1) ... either permanently stored or computed, which are available for use when procedures as defined in the procedural descriptions C(1) ... are performed;
- d. a, possibly empty, set of references to data elements, which references are associated to the procedural descriptions C(1) ..., said data elements are also accessible to possibly further interaction contexts and are available for use when procedures as defined in the procedural descriptions C(1) ... are performed;
- e. a, possibly empty, data list comprising a list of data references to data elements which are available for explicit reference as part of a communication primitive to be used by the procedural description associated with the communication primitive;
- f. a set of access conditions associated to the data elements which are referenced in association to the procedural descriptions;
- g. a set of access conditions associated to the list of data references B(1) ... in the data list.

If there is only one application provided for the data processing unit 5 and there are at least two interaction contexts 19(1), 19(2) each application description comprises:

- a. a data list comprising references E(1) ... to data elements, which references may be accessible to two or more interaction contexts 19(1) ... and may be extended by additional data elements;
- b. a further set of access conditions associated to said references E(1) ... or to said additional data elements and defining restrictions of use.

The set of procedural descriptions in each of the two or more interaction context descriptions also contains an additional last procedural description to be performed immediately before deactivating the context.

Figure 5:
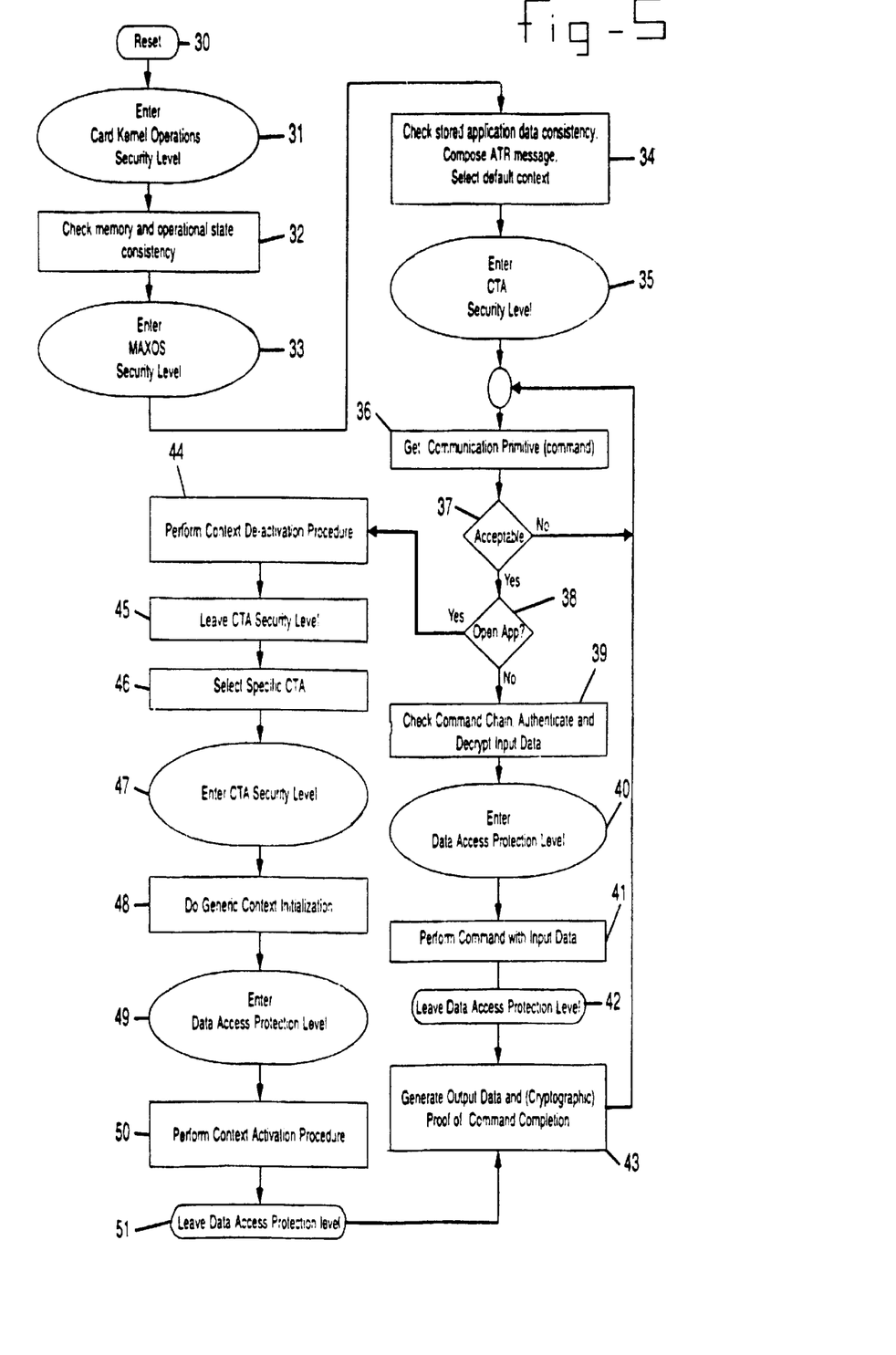
FIG. 5 shows an example of a flow diagram of program execution control and security context switches involved in performing the procedural description invoked by a communication primitive.

FIG. 5 represents the flow of control in the executive program defined above by "MAXOS" (12,17).

After powering the system the software starts with processing a reset code in step 30. In step 31 the kernel operations security level of the data processing unit is entered. The access conditions describing this level are stored in an unmodifiable part of memory, e.g. ROM or hardware logic. In step 32 the non-volatile memory is checked for consistency and any modifications which might have been left unfinished by sudden power down, e.g. by extraction of a smart card, are cancelled. Non-volatile memory consistency check only involves examining state information stored in memory and computing check sums. The content of memory, if accessed at all, is only used to compute check sums. Thus, the consistency check is a safe operation. The exact nature of the consistency check facilities depends on details of hardware within the data processing unit and non-volatile memory modification routines which are to a wide extent irrelevant to the specified security architecture. After the general memory consistency check the pre-computed levels of the security context stored in the memory are verified. Finally, the random access memory of the data processing unit is initiated.

In step 33, if the executing environment is thus declared safe, the secure application security level of the data processing unit is entered. In this level any access to memory pertaining the kernel operations is blocked. Access to application data and description from this level is exclusively provided through routines in the kernel which maintain state information on ongoing memory operations.

Upon first entry after reset, in step 34 application data element descriptors are used to check consistency of stored data with the descriptor and memory is changed if in a state inconsistent with the attribute as described. An answer to reset (ATR) message is composed from application identifiers stored in the application descriptors and completed with a transaction number computed to be unpredictable by the receiving other data processing unit 4. Internal to the data processing unit a terminal command is generated to activate a default interaction context. Directly after the ATR message is sent to the other data processing unit 4 this internal context activation command is executed to provide an interaction context for subsequent commands. The ATR message clearly indicates the readiness of the data processing unit to accept further commands. The default interaction context can be designed as part of a "smart card holder application" which is present as one standard application in all multi-application smart cards. In this specific application context the user, i.c. the smart card holder, can review his personal data or open any of the other applications on the card.

In step 35, as result of the context activation command, the interaction context (CTA) security level is entered for the standard smart card holder CTA.

After an application has been activated completely it is ready to receive commands from the other data processing unit. Further processing depends on the command received:

a command to activate an application is handled different than a command which is to be executed. Therefore, in step 38, after having established that a communication primitive received in step 36 and is established to be acceptable in step 37, it is tested whether a new application has to be activated. If not, step 39 is entered in which the command is checked to determine whether it is allowed and the input data can be accepted. These checks are performed for a command only if specified in the application descriptor. Also a decryption of input data may be carried out in step 39.

If the test succeeds the "data access protection level" is entered, step 40. On this level, the highest security level, routines may be executed which are coded by application providers, step 41. Such routines are stored in the application descriptor and function as an application specific reaction to a specific command issued by the other data processing unit 4. This security level constrains memory access to a subset specifically defined for the command being executed.

After carrying out the command with the submitted input data in step 41, the data access protection level is left, step 42.

Output data and (cryptographic) proof of command completion is generated in step 43. Such function is only performed for a command if specified so in the procedural description, which may be void for any of the defining composing actions. After step 43 the program waits for new communication primitives, step 36.

If no special command routine is defined and the command can be executed by procedures consisting solely of operating system functions the data access protection level (step 40) is not entered, and the command will be performed on the interaction context security level directly as the operating system routines are designed not to violate any data protection.

If, in step 38, it is established that no new application is to activated the program proceeds with step 44 in which a context deactivation procedure is performed. In step 45 the current application specific security level is left and, in step 46, the security level of the executive program "MAXOS" the data accompanying the command are checked.

If the command is allowed by proper authentication as specified for the requested application a new application specific CTA security level is entered, step 47. This level restricts access to data pertaining to the newly opened application.

The data processing unit produces data in response to a context activation command by executing an initialization instruction as defined in the procedure list, step 48. If such an application provider coded routine is present the data access protection level is entered in step 49. The context activation procedure is performed in step 50. In step 51 the data access protection level is left and the response is communicated to the other data processing unit 4 and the data processing unit 4 itself is ready to receive a new command after step 43, specified above.

After having described the FIGS. 1 to 5, now some general remarks to the data exchange system according to the invention are made.

The codes in the procedure library within each application description 18(1), 18(2) may be enhanced by including a specification of the use of their operational parameters into classes relating to attributes pertaining to data elements which can be passed as actual value in a computation, which computation only proceeds if the data attributes and parameter classes match. This provides one way to verify access conditions both to data elements and to functions. Comparing properly encoded bit maps of data attributes and parameter classes respectively may provide an efficient implementation for this additional technique.

The executive program 12, 17 may comprise a reference to an interaction context which is used to initialize the current interaction context in the memory element 20 storing a reference to the interaction context currently being in force. By this measure it is possible to carry out a final action after a detection of an internal inconsistency in a recovery to a normal state of operation or whenever the executive program 12, 17 is active and no explicit interaction context has been specified by a communication primitive received from the other data processing unit 5. This default interaction context may well be one such context contained in the card-holder application as described above.

Additionally, the memory means 9, 16 may comprise an interaction context 11, 19 dedicated to comprise personal identification numbers (PIN's) and the executive program 12, 17 is arranged to verify personal identification numbers supplied by a user of the data exchange system. Several such personal identification numbers, passwords, may be used. One such password may be used to protect use of the device in transactions where privacy sensitive data can be revealed. A second password may be used to protect transactions where data representing a value payable by the password holder is communicated. A third password may be used to protect transactions where operations are performed deemed critical to the security of the application such as modes of protection being called upon as specified within each of the interaction contexts 18 that may require it. Further passwords may be provided for. This PIN management interaction context may well be one such context contained in the card-holder application as described above.

Each application description 13, 18 may comprise a list of numeric values which is constructed to provide identifiers for all interaction contexts 11, 19 and each application description 13, 18 may comprise a combination of any of a first numeric value indicating an application type, a second numeric value indicating a unique identification of the entity providing the application, a third numeric value indicating the nature of the application description 13, 18 and further numbers each uniquely referring to one interaction context 11, 19. The first two numbers may be assigned according to rules well established in the trade, whereas the remaining numbers may be chosen by the application providing entity as deemed appropriate. Especially it may assign numeric values to distinguish between different version of the implementation or to identify the generation of the set of cryptographic keys employed by the application in its cryptographic computations. Additionally, the device may include in the answer to reset message a list for each of the application contexts 11, 19 contained in its memory means an identification number composed of the unique identification values stored with the interaction context. The first element in the list of interaction context identification numbers may be an identification for the default context.

The data communication means 7, 14 are preferably arranged to structure data exchange in blocks of data. These blocks of data comprise at least two parts, a first part being data qualified as operational in that it is used to influence the nature of the operations performed by a command as indicated by a communication primitive or data resulting from operations carried out. A second part will be qualified as security in that it is used to determine that appropriateness of performing an operation or of the acceptability of data within the operational part to be used in the operation or to prove completion of the operation or correctness of the revealed data.

When the data is structured in this way the executive program 17 may be arranged to perform, upon accepting a communication primitive to perform operations specified in the current interaction context 20, 21, each operation as part of a predetermined and fixed sequence of actions, each of which is specified separately as part of a procedure description rule associated to the accepted communication primitive. A first action may be specified as a function to authorize the use of the communication primitive at this point in the sequence of communications. A second action may be specified as a function to decrypt the operational data or any part of it, whereas a third action may be specified as the operational procedure proper. A fourth part may be specified to encrypt any operational data which results from the operations performed and a fifth action may be specified as a function to compute a proof of completion of the performed action or of correctness of the resulting data or to be used in security computations in the receiving data processing unit. These actions are reflected by the flow diagram of FIG. 5.

Additionally, the data processing unit 5 includes in its answer to reset message a number chosen to be unpredictable in value by the receiving data processing unit 4, which can serve as the basis for cryptographic computations. Such a number may be designated as the "card transaction number".

There will be provided for one communication primitive assigned a specified value which will always be interpreted as a request to enter a new interaction context 11, 19. This communication primitive may be designated as the "activation command". The data accompanying the activation command sufficiently specifies the context to be activated possibly by referring to the identification numbers communicated as part of the answer to reset message. The actions performed in responding to the activation command are first described by the procedural description contained in the context accepting the primitive designated as for deactivation and secondly described in the procedural description designated for activation contained in the context specified as to be entered.

Preferably the communication primitive used to enter a specified interaction context 11, 19 comprises numeric values to be used in security calculations in subsequent communications. A first value may be generated randomly by one of the processing units and a second value may serve to identify that one processing unit. Such value may be computed differently according to the requirements of the used cryptographic protocol, such difference can be specified as part of the procedural description Cl. This identification might be the result of computations which are such that the resulting value sufficiently identifies the device and the state of its memory as required by computations or other actions which might be done in subsequent exchanges of data in the interaction context 11, 19 to be activated. Said second value may be designated as "terminal identification".

Additionally, the activation command gives as part of the resulting data a numeric value serving to identify the particular responding data processing unit sufficiently as required by computations or other actions which might be done in subsequent exchanges of data in the context just being activated, which number may be designated as "smart card identification".

Besides the smart card identification number may be computed using cryptographic functions from data stored in the data processing unit 5 or from the data received as part of the activation command in such a way that the number varies in unpredictable manner when computed in response to activation commands received from initiating devices with differing terminal identification numbers; a smart card identification thus computed can be designated as the "smart card pseudonym". Moreover, before performing the actions described in the procedural description of the activation procedure of a context to be entered the executive program may perform a cryptographic computation specified as procedural description in that context designated to be performed upon activation to determine whether the context may be activated. The computations may involve use of the smart card transaction identification, terminal transaction identification and terminal identification and other values stored in the memory means.

As an alternative to these cryptographic protocols supported with specific data in activation commands, commands with bitfield specification of referenced data elements may be used. Then, each communication primitive is composed of two or more numeric values, a first value being used to refer to a procedural description of an action associated to the communication primitive, a second value being composed of a fixed number of binary values each of which is interpreted by the executive program 12, 17 as a reference to a single data element. This data element is specified in the list of external data references in the interaction context 11, 19 concerned, each data element in the list being specified by the presence of a binary value of one of the binary numbers in a corresponding position in the list of binary values. This second value may be designated as the "operand addresses". Each of the data elements which are so specified are made available by the operating executive program 12, 17 to be used in the responding action in a manner as may be described in the procedural description of that action.

As an alternative to cryptographic protocols and commands with bitfield specification of referenced data elements a command format with data match specification of data elements may be applied. In that case, each communication primitive is composed of two or more numeric values, a first value being used to refer to a procedural description of an action associated to the communication primitive, a second value being used to determine which of the data elements available for external reference in an active interaction context 12, 19 will be used while performing responding actions in such a way that any data element is selected if it contains a value that matches said second value. This second value may be designated as the "operand tag specifier". Additionally, the interaction context 11, 19 may contain a procedural description indicating in what way an operand tag specifier given as part of a command are to be compared with data contained in any of the data elements available for external reference in that context, which procedural description is performed to select the intended data elements before the procedural description is performed specifying the command actions proper.

As a further alternative a command format with bitfield specification of command interpretation may be used. Then each communication primitive is composed of two or more numeric values, a first value being used to refer to a procedural description of an action associated to the communication primitive, a second value being composed of a number of binary values which are assigned specific meaning by the executive program 12, 17 to be used in interpreting data formats in the communication primitive and in performing responding actions. Here the second value may be designated as "command modifier". The values are recognized for their assigned meaning by all units equipped with this additional technique.

In case the latter alternative is applied the command modifier may include a binary value which determines whether a third part of the command is to be used as operand address or as operand tag specifier. However, the command modifier may, as an alternative, include a binary value which determines whether the operation performed as response to the command will use data as one data element or is composed of a concatenation of data elements one to be processed in conjunction with each data element specified as part of the command value using operand addresses or the operand tag specifier. Alternatively, the command modifier may include a binary value which determines whether data provided with the command is encoded using the tag-length-value method to discriminate successive concatenated data elements.

A further option is that the command modifier may include a binary value which determines whether performing the action implied by the command will actually lead to effective change of data stored in the data processing unit 5 (smart card) or actually result in data computed by the data processing unit 5, or that the command result is data reflecting the state of the unit with regard to the acceptability of the command, the data accompanying it, the size of the data which could result from computations or other sundry attributes.

In short, the new technique introduced above in smart card implementation is the concept of a separate execution environment. In this approach the processing means and other resources in a computer are shared between different applications as if the application was the only user of the computer. Building on this new technique in smart card implementations in addition a mechanism is provided to define multiple access conditions for data shared by a number of related applications. A second technique supported by the separate execution environments and introduced above is the possibility to define the functional meaning of commands in each environment to obtain a minimum number of commands in each interaction between two similar data processing units 4, 5 within a data exchange system. Finally it is possible with the new technique for names referring to stored data elements to be assigned within each context separately. The reference to stored data elements as part of a command received from one of the data processing units 4, 5 can thus be made very efficient: due to the very small number of data elements and small number of distinct operations that is used in today's smart card practice in each environment separately only a few bits are needed to encode the name and instruction space. In a similar fashion access conditions, methods of verification thereof and cryptographic operations available to that end in actual smart cards will be very restricted in number and they can be expressed very efficiently in the two tier hierarchy of interaction context descriptions 19(1) . . . enclosed in application description 18.

I claim:

1. Data exchange system comprising multiple data processing units (4, 5) comprising multiple portable data processing units and multiple non-mobile data processing units, said portable data processing units being arranged to establish a temporary communication link (6) with at least one other data processing unit and said non-mobile are arranged to establish a permanent communication link (6), communications along said communication links being synchronous, each of said data processing units (4, 5) comprising data communication means (7, 14), processing means (8, 15) and memory means (9, 16), the latter comprising an executive program (12, 17), wherein the memory means (9, 16) of the totality of the processing units further comprises descriptions of the possible modes of communication between the data processing units as interaction contexts (11(1) . . . 11(m), 19(1) . . . 19(m)) in accordance with the following data structure:

a. a set of basic distinct communication primitives (A(1) . . . ) which are distinct values and are accepted as commands upon receipt thereof by any of said data processing units (4, 5) during communications with at least one other of said data processing units (5, 4);

b. a set of procedural descriptions (C(1) . . . ) defining procedures to be performed by any of said data processing units (4, 5) in response to accepted communication primitives (A(1) . . . );

c. a set of data elements (H(1) . . . ) distributed over said multiple processing units (4, 5), which are either permanently stored or computed and which are available for use when the procedures as defined in the procedural descriptions (C(1) . . . ) are performed, the use of and the access to said data elements being controlled;

d. a first set of references (r(1), r(2), r(3)) to said data elements (H(1) . . . ), said references of said first set (r(1), r(2), r(3)) being associated to the procedural descriptions (C(1) . . . ) such that said data elements are available for use when procedures as defined in the procedural descriptions (C(1) . . . ) are performed;

e. a possible second set of references (r(4), r(5), r(6)) to said data elements (H(1) . . . ), said references of said second set (r(4), r(5), r(6)) being associated to procedural descriptions (C(4) . . . ) of possibly further interaction contexts, such that said data elements are available for use when procedures as defined in procedural descriptions (C(1) . . . ) of said possibly further interaction contexts are performed;

f. a, possibly empty, first data list (B(1) . . . ) comprising a possibly ordered third set of references (u(1) . . . ) to said data elements (H(1) . . . ), said third set of references (u(1) . . . ) being available as targets for references of a fourth set of references (w(1) . . . ), said references of said fourth set (w(1) . . . ) being part of said communication primitives (A(1) . . . ), which data elements are to be used by the procedural descriptions (C(1) . . . ) associated with said communication primitives (A(1) . . . );

g. a first set of access conditions associated to said data elements (H(1) . . . ), which conditions are consulted in association to said first set (r(1), r(2), r(3)) and second set (r(4), r(5), r(6)) of references to said data elements;

h. a second set of access conditions associated to the third set of references (u(1) . . . ) in the first data list (B(1) . . . ).

2. Data processing unit of a data exchange system according to claim 33 and comprising multiple data processing units (4, 5), of which at least one is portable, said data processing unit (5) comprising data communication means (14), processing means (15) and memory means (16), the latter comprising an executive program (17), wherein the memory means (16) further comprises descriptions of the possible modes of communication between the data processing units as interaction contexts (19(1) . . . 19(m)) in accordance with the following data structure:

a. a set of basic distinct communication primitives (A(1) . . . ) which are distinct values and are accepted as commands upon receipt thereof by said data processing unit (5) during communications with at least one other of said data processing units (4);

b. a set of procedural descriptions (C(1) . . . ) defining procedures to be performed by said data processing unit (5) in response to accepted communication primitives (A(1) . . . );

c. a, possibly empty, set of data elements (H(1) . . . ) which are either permanently stored or computed and which are available for use when the procedures as defined in the procedural descriptions (C(1) . . . ) are performed, the use of and the access to said data elements being controlled;

d. a, possibly empty, first set of references (r(1), r(2), r(3)) to said data elements (H(1) . . . ), said references of said first set (r(1), r(2), r(3)) being associated to the procedural descriptions (C(1) . . . ) such that said data elements are available for use when procedures as defined in the procedural descriptions (C(1) . . . ) are performed;

e. a, possibly empty, second set of references (r(4), r(5), r(6)) to said data elements (H(1) . . . ), said references of said second set (r(4), r(5), r(6)) being associated to procedural descriptions (C(4) . . . ) of possibly further interaction contexts, such that said data elements are available for use when procedures as defined in procedural descriptions (C(1) . . . ) of said possibly further interaction contexts are performed;

f. a, possibly empty, first data list (B(1) . . . ) comprising a possibly ordered third set of references (u(1) . . . ) to said data elements (H(1) . . . ), said third set of references (u(1) . . . ) being available as targets for references of a fourth set of references (w(1) . . . ), said references of said fourth set (w(1) . . . ) being part of said communication primitives (A(1) . . . ), which data elements are to be used by the procedural descriptions (C(1) . . . ) associated with said communication primitives (A(1) . . . );

g. a first set of access conditions associated to said data elements (H(1) . . . ), which conditions are consulted in association to said first set (r(1) r(2), r(3)) and second set (r(4), r(5), r(6)) of references to said data elements;

h. a second set of access conditions associated to the third set of references (u(1) . . . ) in the first data list (B(1) . . . ) said data processing unit containing more than one interaction context, wherein at least one of the communication primitives accepted by said data processing unit will be to selectively indicate one of the said interaction contexts (19(1) . . . ) for further referral in said data processing unit.

3. Data exchange system according to claim 1 further characterized in that the set of the procedural descriptions (C(1) . . . ) at least comprises a first procedural description to be performed in response to the communication primitive, or primitives, which indicate one of the said interaction contexts (19(1) . . . ) for further referral in the processing unit accepting the communication primitives, such performance resulting in a proper activation of the indicated interaction context.

4. Data exchange system according to claim 1 further characterized in that the memory means further comprises at least two interaction contexts (19(1) . . . ) and in that the set of the procedural descriptions (C(1) . . . ) at least comprises a last procedural description to be performed in response to the communication primitive, or primitives, which indicate one of the said interaction contexts (19(1) . . . ) for further referral in the processing unit accepting the communication primitive, such performance resulting in a proper deactivation of the interaction context which was indicated while the communication primitive was received.

5. Data exchange system according to claim 1 characterized in that the memory means (16) further comprises at least two interaction contexts (19(1) . . . 19(m)), at least one application description (18(1) . . . ) and a memory element (20) storing a reference to the interaction context currently being in force, each application description comprising:

a. a data list comprising references (E(1) . . . ) to data elements, which references may be accessible to two or more interaction contexts (19(1) . . . ) and may be extended by additional data elements;

b. a further set of access conditions associated to said references (E(1) . . . ) or to said additional data elements and defining restrictions of use.

6. Data exchange system according to claim 5 characterized in that each application description (18(1) . . . ) also comprises a procedure library comprising codes (F(1) . . . ) which can be used by procedural descriptions (C(1) . . . ) of each interaction context associated to each of said application descriptions (18(1) . . . ).

7. Data exchange system according to claim 5 characterized in that the memory means comprises at least two application descriptions (18(1) . . . ) and units of executable code (G(1) . . . ) which can be used by procedural descriptions (C(1) . . . ) of each interaction context (19(1) . . . ) within each application description (18(1) . . . ) or by each unit of executable code (F(1) . . . ) of each procedure library within each application description (18(1) . . . ).

8. Data exchange system according to claim 6 characterized in that the units of executable code in the procedure library are enhanced by including a specification of the use of their operational parameters into classes relating to attributes pertaining to data elements which can be passed as actual value in a computation, which computation only proceeds if the data attributes and parameter classes match.

9. Data exchange system according to claim 5 characterized in that the executive program (17) comprises a reference to a default interaction context which is used to initialize the memory element (20) storing a reference to the interaction context currently being in force, in order to carry out a final action after a detection of an internal inconsistency in a recovery to a normal state of operation or whenever the executive program (17) is active and no explicit interaction context has been specified by a communication primitive received from a similar data processing unit (4).

10. Data exchange system according to claim 1 characterized in that the executive program (17) comprises routines constituting an interpreter for coded instructions for an abstract processor, such that the majority of procedural descriptions (C(1) . . . ) and some of the units of executable code (F(1) . . . , G(1) . . . ) are coded in numeric values for interpretation by said interpreter routines.

11. Data exchange system according to claim 6 characterized in that the procedural descriptions (C(1) . . . ) are encoded as indexes in a list over a sub set of procedures contained in the library of procedures comprising units of executable code.

12. Data exchange system according to claim 11 characterized in that the encoding of the procedural descriptions (C(1) . . . ) is in such small values that more than one description can be held in a basic unit of access for the memory means (16) or that the description can be combined with other relevant information in the same basic unit of memory access.

13. Data exchange system according to claim 12 characterized in that at least one of the encoding values of the procedural descriptions (C(1) . . . ) refers to a special function of the executive program (17) that is designed to select by indirection the actual function to perform for the encoded procedural description possibly by incorporating additional coding information stored in association with the procedural description encoded with said special values.

14. Data exchange system according to claim 1 characterized in that the memory means (16) comprises an interaction context dedicated to comprise Personal Identification Numbers and that the executive program (17) is arranged to verify Personal Identification Numbers supplied by a user of the data exchange system.

15. Data exchange system according to claim 1 characterized in that the memory means (16) comprises at least one interaction context dedicated to manage the number and content of other interaction contexts (19(1) . . . ) also contained in said memory means.

16. Data exchange system according to claim 5 characterized in that each application description (18(1) . . . ) comprises a list of numeric values which is constructed to provide identifiers for all interaction contexts (19(1) . . . ) and comprises at least one of the following numeric values, a first indicating an application type, a second numeric value indicating a unique identification of the entity providing the application, a third numeric value indicating the nature of the application description (18(1) . . . ) and further numbers each uniquely referring to one interaction context (19(1) . . . ) associated with the application description.

17. Data exchange system comprising multiple data processing units (4, 5) of which some, which are portable establish a temporary communication link (6) and of which others, which are not mobile may have a permanent communication link (6) said units comprising data communication means (7, 14), processing means (8, 15) and memory means (9, 16) the latter comprising an executive program (12, 17) characterized in that the communication means (14) is arranged to structure data exchange in blocks of data comprising at least two parts, a first part being data qualified as operational in that it is used to influence the nature of the operations performed by a command as indicated by a communication primitive or data resulting from operations carried out, a second part being qualified as security in that it is used to determine the appropriateness of performing an operation or of the acceptability of data within the operational part, to be used in the operation or to prove completion of the operation or correctness of the resulting data.

18. Data exchange system according to claim 17 characterized in that the executive program (17) is arranged to perform, upon accepting a communication primitive to perform operations specified in the current interaction context (19(1) . . . ), each operation as part of a predetermined and fixed sequence of actions each of which is specified separately as part of a procedural description associated to the accepted communication primitive, which procedural description at least comprises distinct descriptions, any of which may be void, for the following actions:

a. authorization of the use of the communication primitive;
  b. decryption of operational data or any part of it;
  c. performing a command with input data;
  d. encryption of any operational data resulting from any operation performed;
  e. computation of a proof of completion of any performed action or of correctness of the resulting data to be used in security computations.

19. Data exchange system according to claim 17 characterized in that the data processing unit (5) generates a random transaction number upon initializing data transfer, which serves as basis for cryptographic computations.

20. Data exchange system according to claim 17 characterized in that one communication primitive is assigned a specified value which will always be interpreted as a request to enter a new interaction context (19(1) . . . ).

21. Data exchange system according to claim 17 characterized in that it comprises a further data processing unit (4) comprising the same elements as the data processing unit (4) which might optionally contain in its memory an application programmers interface (10) which consists of program code designed to allow additional computer programs to be implemented to give users control over the sequence of exchanged communication primitives or to influence the data transferred in them or to learn or further process the data received in the exchange.

22. Data exchange system according to claim 21 characterized in that the primitive used to enter a specified interaction context (19(1) . . . ) comprises numeric values to be used in security calculations in subsequent communications, a first value generated randomly or of similarly unique nature by one of the processing units and possibly a second value serving to proof the authenticity of said one processing unit or to otherwise identify said one processing unit.

23. Data exchange system according to claim 21 characterized in that each communication primitive except a first one signalling a reset is composed of two or more numeric values, a first value being used to refer to a procedural description of an action associated to the communication primitive, a second value being composed of a fixed number of binary values each of which is interpreted by the executive program (12, 17) as a reference to a single data element.

24. Data exchange system according to claim 21 characterized in that each communication primitive except a first one signalling a reset is composed of two or more numeric values, a first value being used to refer to a procedural description of an action associated to the communication primitive, a second value being used to determine which of the data elements available for external reference in an active interaction context (19(1) . . . ) will be used while performing responding actions in such a way that any data element is selected if it contains a value that matches said second value or if it contains a value that is otherwise sufficient to indicate it.

25. Data exchange system according to claim 21 characterized in that each communication primitive except a first one signalling a reset is composed of two or more numeric values, a first value being used to refer to a procedural description of an action associated to the communication primitive, a second value being composed of a number of binary values which are assigned specific meanings by the executive program (12, 17) to be used in interpreting data formats in the communication primitive and in performing responding actions.

26. Data exchange system according to claim 17 characterized in that portable processing units are implemented in smart cards.

27. Data exchange system according to claim 17 characterized in that portable processing units are implemented in PCMCIA cards.

28. Data exchange system according to claim 26 characterized in that the communication means (14) utilizes external communication means to establish a data link (6) such external communication means as are made available to the data processing unit (5) by the data processing unit, or similar such electronic device hosting the PCMCIA or smart card which implements the data processing unit (5).

29. Data exchange system according to claim 17 characterized in that the data processing unit (4) is implemented as portable personal computer.

30. Data exchange system according to claim 28 characterized in that the communication means (7) utilizes a smart card reader.

31. Data exchange system according to claim 28 characterized in that the communication means (7) utilizes a PCMCIA card slot.

32. Data exchange system according to claim 26 characterized in that the communication means (7) primarily or additionally utilizes non contact data transfer with electromagnetic fields.

* * * * *